(12) United States Patent
Fletcher et al.

(10) Patent No.: US 11,567,855 B1
(45) Date of Patent: Jan. 31, 2023

(54) AUTOMATED FAULT INJECTION TESTING

(71) Applicant: Two Six Labs, LLC, Arlington, VA (US)

(72) Inventors: Austin Fletcher, Keego Harbor, MI (US); Daniel Su, Arlington, VA (US); Bradley Boccuzzi, Arlington, VA (US)

(73) Assignee: Two Six Labs, LLC, Arlington, VA (US)

( * ) Notice: Subject to any disclaimer, the term of this patent is extended or adjusted under 35 U.S.C. 154(b) by 219 days.

(21) Appl. No.: 17/015,778

(22) Filed: Sep. 9, 2020

(51) Int. Cl.
*G06F 11/36* (2006.01)
*G06F 11/263* (2006.01)
*G06F 11/277* (2006.01)

(52) U.S. Cl.
CPC ........ *G06F 11/3644* (2013.01); *G06F 11/263* (2013.01); *G06F 11/277* (2013.01); *G06F 11/3692* (2013.01)

(58) Field of Classification Search
CPC .... G06F 11/36; G06F 11/3644; G06F 11/263; G06F 11/277; G06F 11/3692
See application file for complete search history.

(56) References Cited

U.S. PATENT DOCUMENTS

| | | | | |
|---|---|---|---|---|
| 3,887,852 A * | 6/1975 | Fernandes | ............... | H02P 25/26 318/732 |
| 6,996,808 B1 * | 2/2006 | Niewiadomski | ...... | G06F 9/4486 714/38.14 |
| 7,020,803 B2 * | 3/2006 | Wolin | ................. | G06F 11/2215 714/25 |
| 7,676,795 B2 * | 3/2010 | Elnozahy | ............ | G06F 11/3636 714/21 |
| 7,814,477 B2 * | 10/2010 | Sun | ...................... | G06F 9/44521 717/113 |
| 9,116,717 B2 * | 8/2015 | Soeder | ....................... | G06F 8/41 |
| 10,282,227 B2 * | 5/2019 | Lueh | ...................... | G06F 9/3009 |
| 10,671,361 B2 * | 6/2020 | Li | ........................... | G06F 8/433 |
| 11,181,940 B2 * | 11/2021 | Chossat | ................... | H03K 5/19 |
| 11,321,457 B2 * | 5/2022 | Hershman | ............ | H03K 19/003 |
| 11,321,458 B2 * | 5/2022 | Hershman | ............... | G06F 21/77 |
| 2004/0237067 A1 * | 11/2004 | Sun | ......................... | G06F 21/10 717/110 |
| 2005/0071818 A1 * | 3/2005 | Reissman | ........... | G06F 11/3672 717/127 |

(Continued)

*Primary Examiner* — Kamini B Patel
(74) *Attorney, Agent, or Firm* — Armis IP Law, LLC

(57) ABSTRACT

An automated fault injection testing and analysis approach drives fault injection into a processor driven instruction sequence to quantify and define susceptibility to external fault injections for manipulating instruction execution and control flow of a set of computer instructions. A fault injection such as a voltage or electromagnetic pulse directed at predetermined locations on a processor (Central Processing Unit, or CPU) alters a result of a processor instruction to change values or execution paths. One or more quantified injections define an injection chain that causes a predictable or repeatable deviant result from an expected execution path through the code executed by the processor. Based on accumulation of fault injections and results, a repeatable injection chain and probability identifies an external action taken on a processing device to cause unexpected results that differ from an expected execution of a program or set of computer instructions.

11 Claims, 9 Drawing Sheets

(56) References Cited

U.S. PATENT DOCUMENTS

| | | | | |
|---|---|---|---|---|
| 2006/0253687 A1* | 11/2006 | Jakubowski | ............ | G06F 21/14 |
| | | | | 712/210 |
| 2008/0178044 A1* | 7/2008 | Showalter | ........... | G06F 11/3688 |
| | | | | 714/34 |
| 2010/0287535 A1* | 11/2010 | Kim | .................... | G06F 11/3688 |
| | | | | 717/127 |
| 2011/0067015 A1* | 3/2011 | Takagi | .................... | G06F 8/456 |
| | | | | 717/149 |
| 2013/0158973 A1* | 6/2013 | Hsiong | .................. | G06F 30/33 |
| | | | | 703/14 |
| 2015/0277874 A1* | 10/2015 | Haraguchi | .............. | G06F 8/443 |
| | | | | 717/160 |
| 2016/0334467 A1* | 11/2016 | Cho | ........................ | G06F 30/33 |
| 2016/0350549 A1* | 12/2016 | Hampel | ................ | H04L 63/123 |
| 2017/0161073 A1* | 6/2017 | Chen | .................... | G06F 11/3632 |
| 2019/0205233 A1* | 7/2019 | Jung | ..................... | G06F 11/263 |
| 2020/0301798 A1* | 9/2020 | Cardoso | ................ | G06F 11/261 |
| 2021/0048466 A1* | 2/2021 | Xue | ........................ | G06F 21/75 |

* cited by examiner

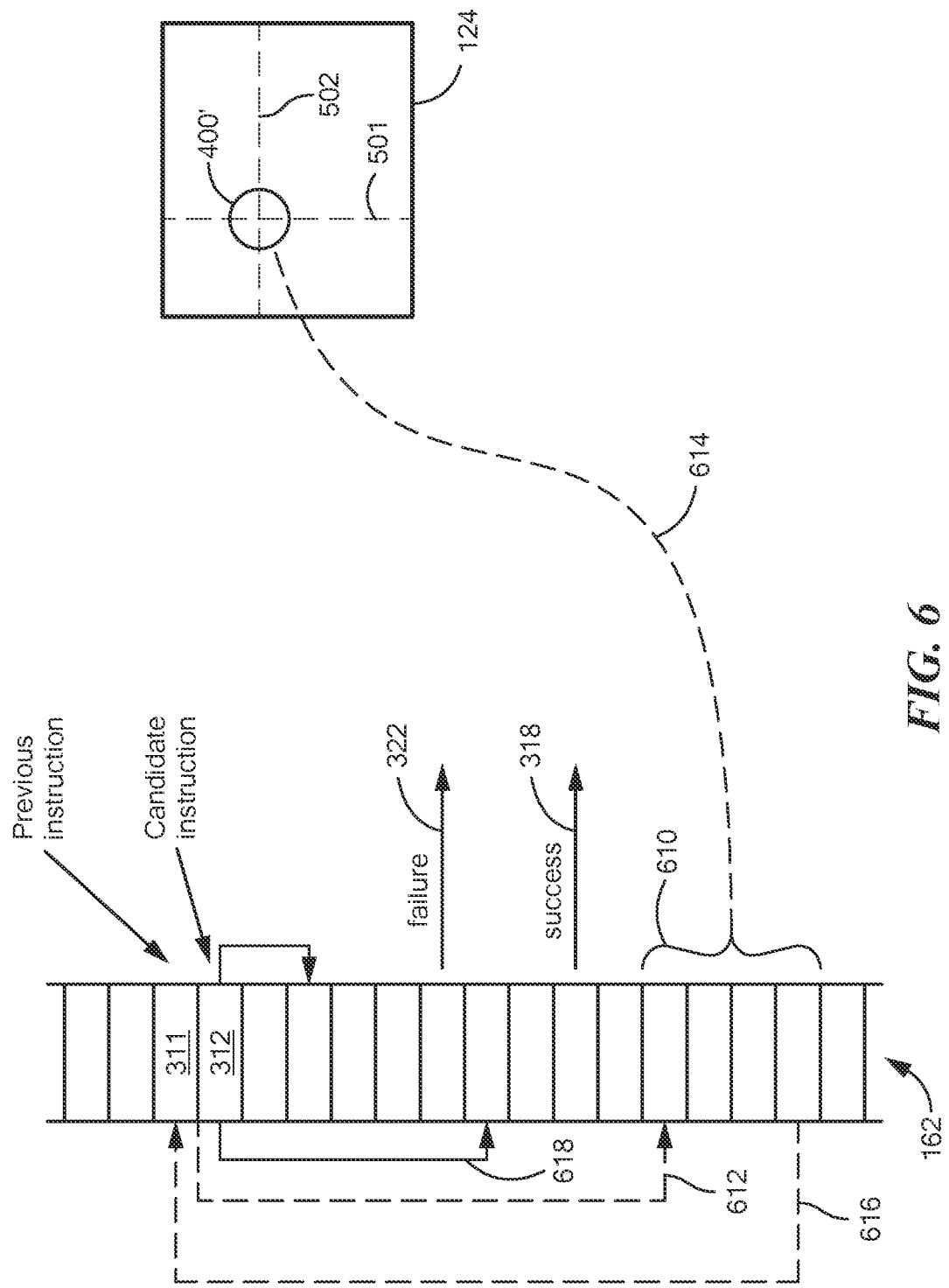

AUTOMATED FAULT INJECTION TESTING

STATEMENT REGARDING FEDERALLY SPONSORED RESEARCH AND DEVELOPMENT

This invention was made with government support under contract no. FA8650-16-C-7626 sponsored by the Air Force Research Laboratory (AFRL) and Defense Advanced Research Agency awarded by the United States Government. The Government has certain rights in the invention.

BACKGROUND

Computer programs in various forms have become readily deployed in recent decades for performing manual tasks and information storage and arrangement. One advantage to computer driven tasks derives from the repeatability of software instruction. Computers following a program are deemed to always generate a consistent result based on given inputs. Computer programs do not make "human" errors such as typos, misspellings, or inconsistent placement of robotically controlled effectors. There is a perception that computer software will deterministically execute a given instruction sequence the same way every time, and this repeatability of results is the basis for substantial trust in the information and actions entrusted to computer driven operations.

SUMMARY

An automated fault injection testing and analysis approach drives fault injection into a processor driven instruction sequence to quantify and define susceptibility to external fault injections for manipulating instruction execution and control flow of a set of computer instructions. A fault injection such as a voltage or electromagnetic pulse directed at predetermined locations on a processor (Central Processing Unit, or CPU) alters a result of a processor instruction to change values or execution paths. One or more quantified injections define an injection chain that causes a predictable or repeatable deviant result from an expected execution path through the code executed by the processor. Based on accumulation of fault injections and results, a repeatable injection chain and probability identifies an external action taken on a processing device to cause unexpected results that differ from an expected execution of a program or set of computer instructions.

Such fault injections are not only directed at the processor, but anything that can potentially cause data corruption through an electromagnetic aberration or disturbance. For example, disruptive influences may be directed towards RAM (Random Access Memory) or other state retaining structures, or the traces that go to RAM, or in certain cases other voltage control circuitry. The injection chain is defined not only by the location of injection but also the timing, intensity, number of pulses, duration of pulses, time between repetitions, polarity of injection (such as a direction of current flow through a coil), all of which is configurable.

Configurations herein are based, in part, on the observation that computer and information system security often focuses on intrinsic integrity of the computer program or instructions performing sensitive tasks. A computer program is expected to perform according to its programmed instructions every single time, and therefore analysis of the program code instructions and the logic it represents assures system security and integrity. Unfortunately, conventional approaches to computer testing do not encompass events and occurrences external to the computer itself that can cause unexpected and possibly harmful results. Events or attacks such as electromagnetic pulses, voltage spikes or deviations, and magnetic fields can temporarily affect an electronic circuit and in turn, a result of that circuit. In a digital circuit, this can produce erroneous results or values that appear normal. Conventional protection against such types of external influences can be problematic to define and implement, due to the probabilistic nature and time-fleeting scenarios that can cause unexpected operation. Accordingly, configurations herein substantially overcome the shortcomings of conventional fault injection testing by providing an automated and repeatable testing apparatus and method that identifies fault injections having a predictable effect on target processors and computer programs to identify vulnerabilities imposed by injection parameters.

A method for forcing a control flow of an instruction sequence includes identifying a candidate instruction in an instruction sequence under analysis, such as a program or code segment, and estimating a duration for execution to proceed to the candidate instruction. An analysis engine performs a series of sample injections directed to modifying a result of the candidate instruction at an execution time based on the estimated duration, and evaluating a path result based on an execution path taken as a result of the sample injection to determine if the injection altered instructions and induced a path flow not intended by the instruction sequence

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 6 shows operation of an injected fault as in FIG. 4 on an instruction sequence as in FIG. 3.

DETAILED DESCRIPTION

In the discussion that follows, a processor based device, or computer, defines a target system receptive to fault injection testing by an analysis engine depicting the system and methods for fault injection and analysis. The disclosed fault injections may be performed on any digital circuit including memory, processors, and other circuits responsive to the generated faults such as EMF pulses, voltage deviations and magnetic interference. The disclosed approach may be applied to any deployed system for inducing alternate processor control paths, and quantifying the attempted faults with the induced results for identifying a likelihood of repeatability.

Figure 1:
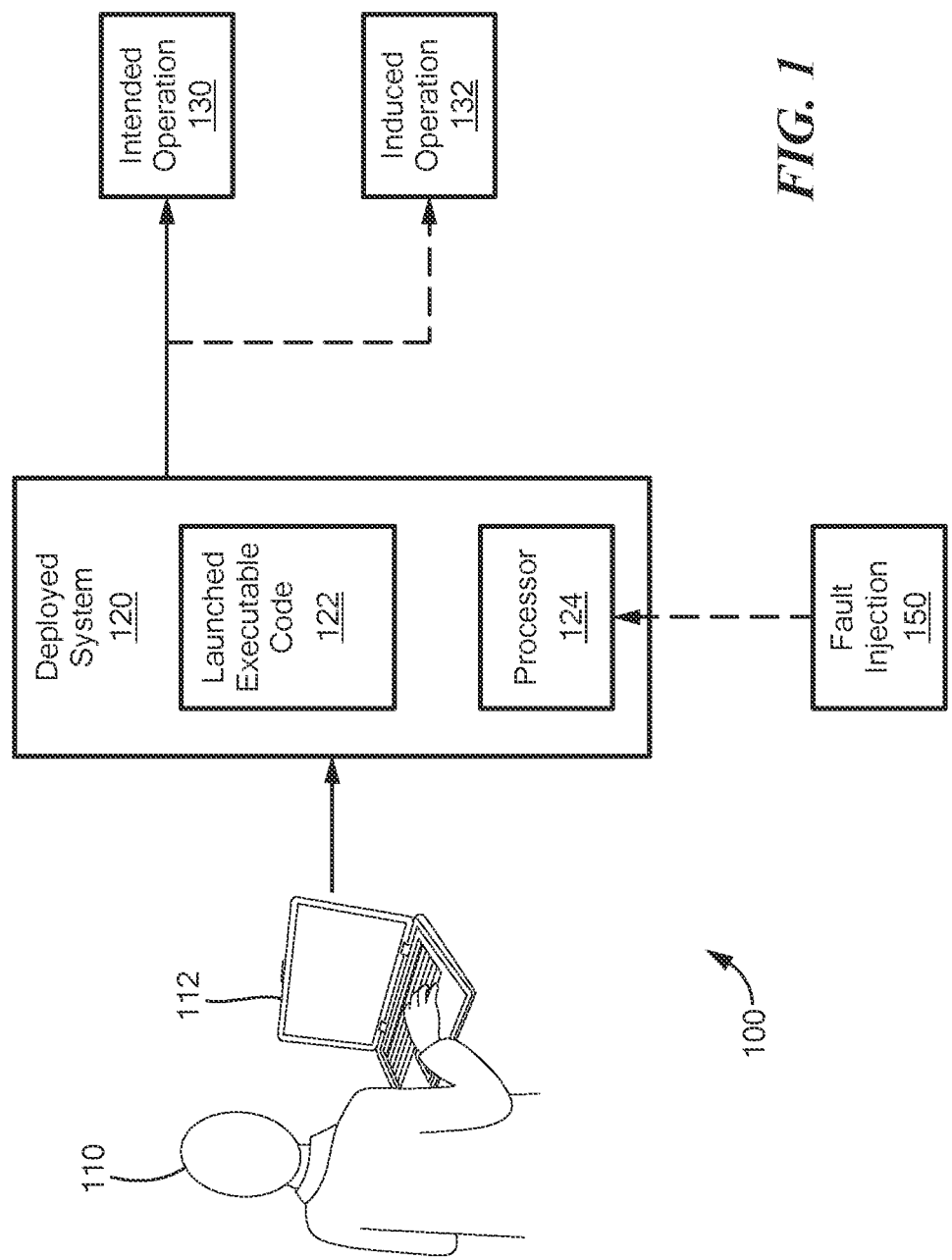
FIG. 1 is a context diagram of an information processing environment suitable for use with configurations herein.

FIG. 1 is a context diagram of an information processing environment suitable for use with configurations herein. Referring to FIG. 1, in an information processing environment 100, users 110 employ a deployed system 120 through an interface device 112 for a variety of personal, professional, industrial and/or academic uses. The interface device 112 may be any suitable arrangement of keyboard and/or pointer input, and includes a rendering medium such as a screen for entering and receiving information from the deployed system 120. Similarly, the deployed system 120 may be any suitable processer driven device responsive to an instruction set or program of computer instructions, and may be local or coupled by available public or private access networks, VPNs (virtual private networks), LANs (Local Area Networks) or WANs (Wide Area Networks), as well as wireless 3G/4G/5G or similar cellular or WiFi connectivity.

In the deployed system 120, one or more executable code segments including executable code 122 are launched for performing computing operations on behalf of the user 110. The launched executable code 122 takes the form of machine instructions executable by a processor 124 for performing an intended operation 130, based on the instructions, data and conditional branching logic contained in the instructions in the launched executable code 122. A fault injection 150 is an external occurrence, such as EMF interference, pulse or voltage variation that causes one or more of the instruction in the executable code 122 to deviate from the intended operation 130 and instead pursue instructions or control paths (paths) that result in induced, or unintended operation 132 triggered by the fault injection. The discussion below depicts a processor 124 executing the instructions as the recipient of the fault, however any semiconductor memory or processing circuit may be the recipient.

Figure 2:
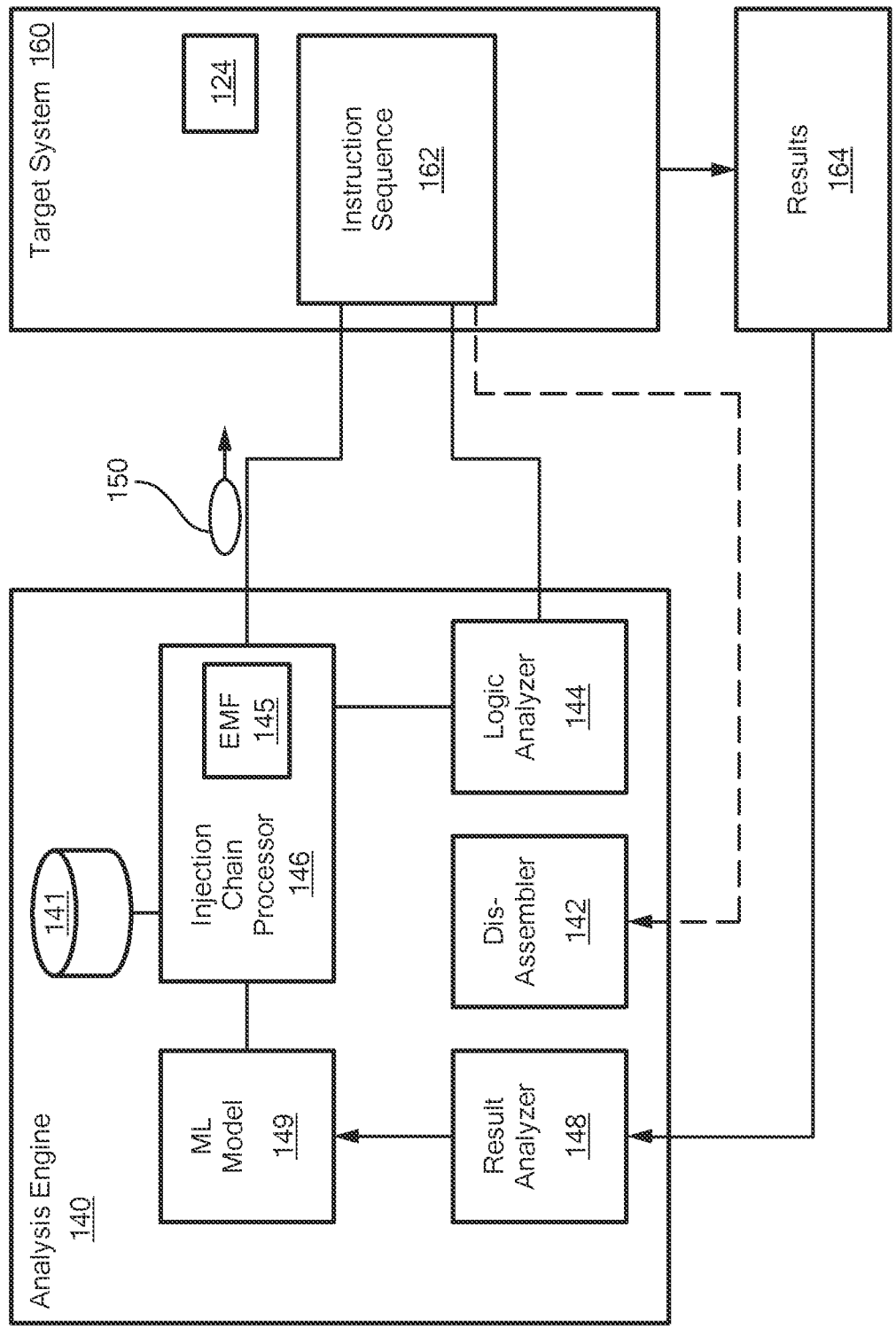
FIG. 2 is a schematic block diagram of testing an approach for use in the environment of FIG. 1.

FIG. 2 is a schematic block diagram of testing an approach for use in the environment of FIG. 1. Referring to FIGS. 1 and 2, the disclosed approach includes an analysis engine 140 coupled to a target system 160, which is a system under test representing the deployed system 120 receiving the injected faults. The analysis engine 140 is a testing device for forcing a control flow of an instruction sequence 162 in the target system 160, and includes a code disassembler 142 for identifying a candidate instruction in an instruction sequence 162 under analysis. The instruction sequence 162 is defined by a program or fragment of binary (machine) instructions launched in the target system 160. Such binary instructions almost always derive from a human readable source code version that is compiled, linked, and/or loaded into a memory area of the target system. The code disassembler 142 recovers and identifies the instruction sequence including the candidate instruction to which a fault is directed.

A debugging utility includes a logic analyzer 144 configured to estimate a duration for execution to proceed to the candidate instruction. This allows a timing reference based on the number of instructions to be executed before the candidate instruction, based on the disassembled instructions from the disassembler.

An injection chain processor 146 includes an EMF (electromagnetic field) inducer 145 for performing a sample injection 150 directed to modifying a result of the candidate instruction at an execution time based on the estimated duration. Fault injections may be performed by any suitable mechanism, such as magnetic or voltage fluctuations, in addition to an EMF pulse. A results analyzer 148 receives gathered results 164 of the instruction sequence 162 for evaluating a path result based on an execution path taken as a result of the sample injection 150. A successful injection generates results 164 corresponding to the induced operation 132, while an unsuccessful injection generates results consistent with the intended operation 130. The results 164 and the injection 150 (or injection chain, discussed below) may be provided to a machine learning model 149 for coalescing probability of different factors and results of a plurality of injections 150. Injections 150 and expected, probabilistic results are stored in a repository 141 for subsequent use and analysis.

Figure 3:
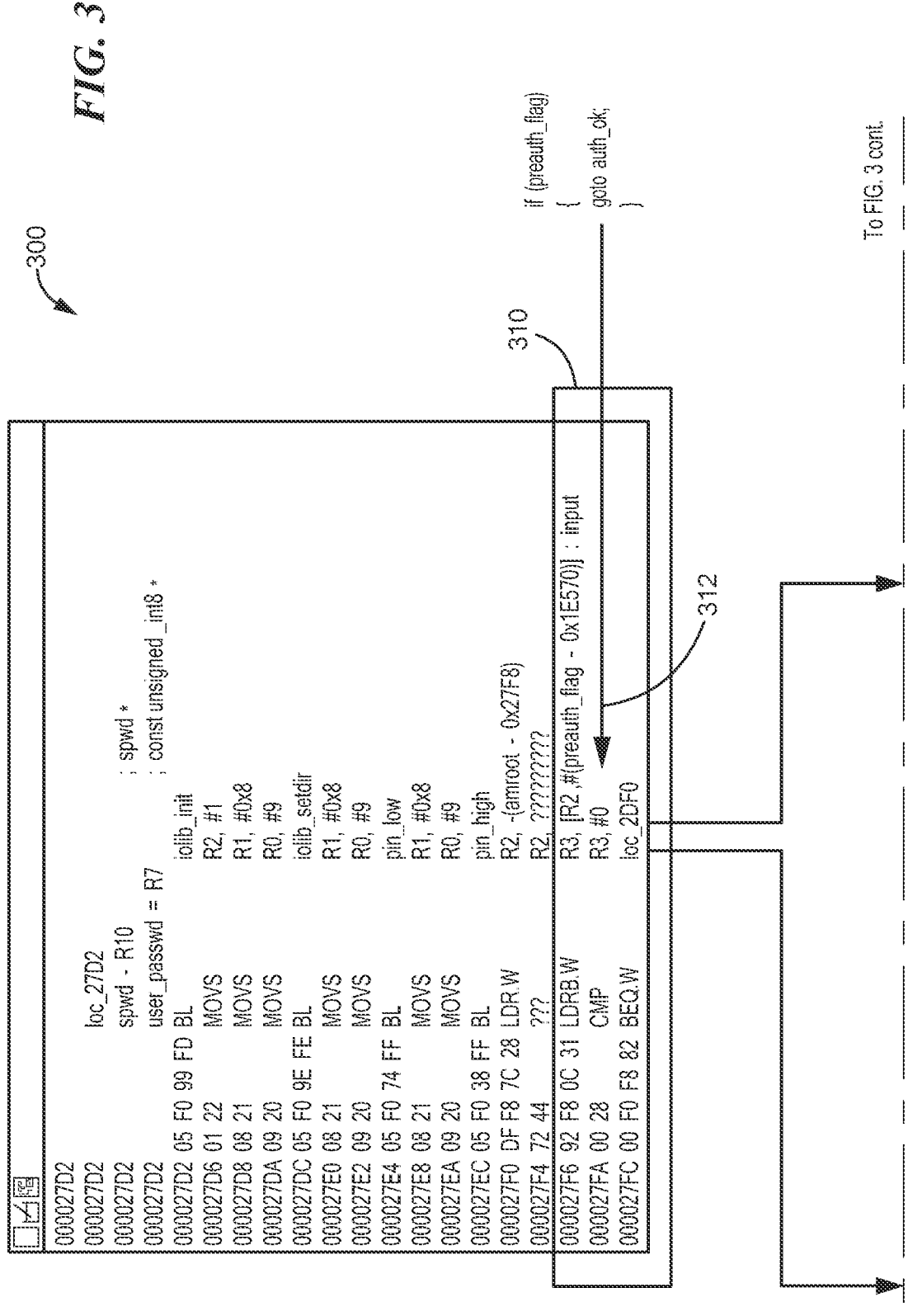
FIG. 3 shows a code level example of a testing process according to the block diagram of FIG. 2.
Figure 3:
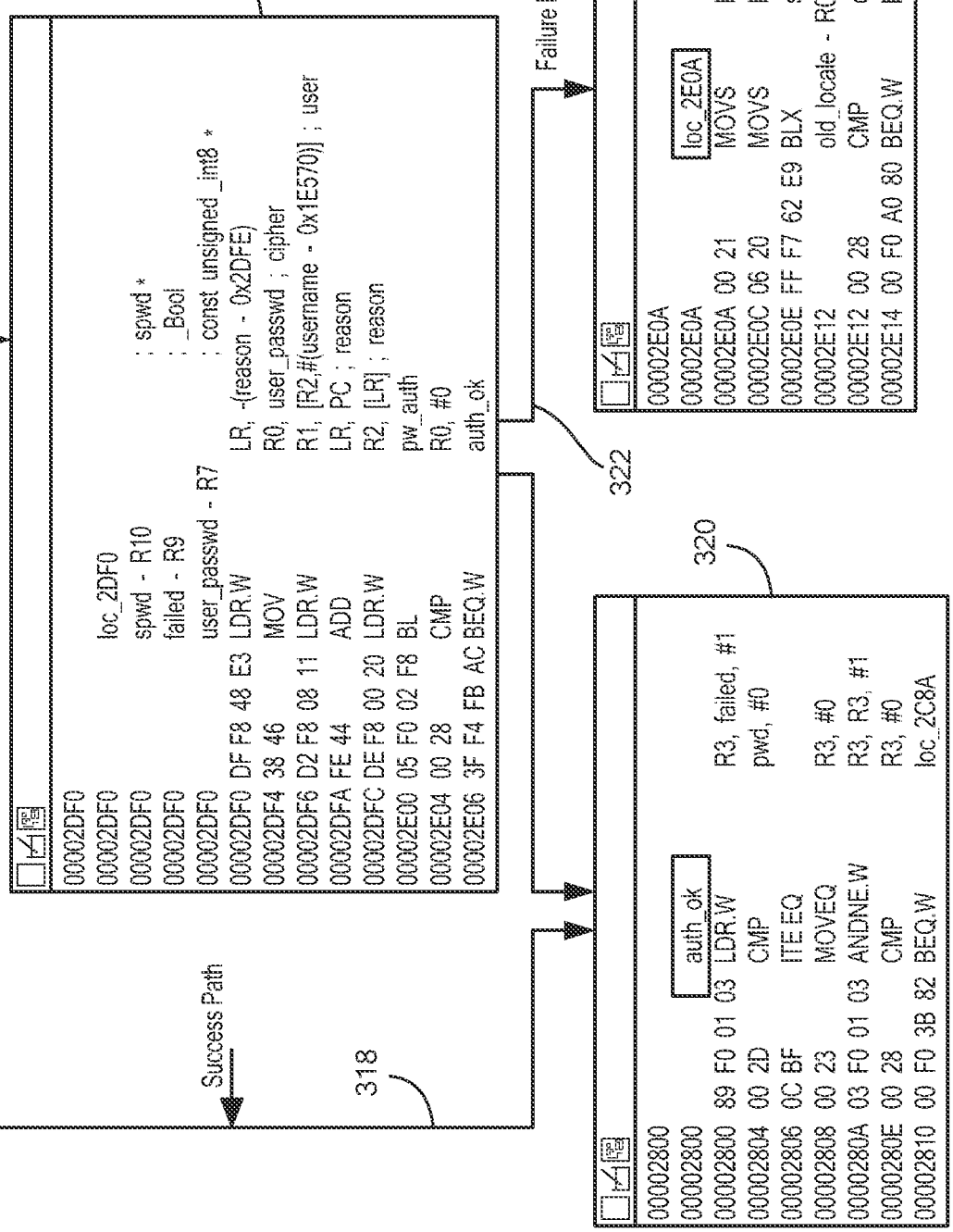

FIG. 3 shows a code level example of a testing process according to the block diagram of FIG. 2. In a particular example, the fault injections, or simply injections 150, take the form of an EMF pulse directed at a location on the processor 124, which is defined by a square planar area addressable by Cartesian positioning. Fault injection testing occurs according to three primary features:

A first feature includes selection of program addresses and locations to target for injection, performed via static or dynamic analysis of the target binary application, automated instrumentation, and test generation. Locations of branch instructions, such as a password evaluation comparison that leads to entry or denial of access, indicate good examples of point of interest instructions.

Second, automated testing of the previously generated candidate addresses is performed via iterative scanning.

Third, collection and analysis of scan results as generated employs machine learning techniques to find optimal injection parameters to cause a desired effect on the target system. The machine learning system is used to iterate testing parameters to experimentally verify optimal injection parameters. This is significantly faster and more accurate than brute force or purely iterative results would return, all in an automated fashion.

This approach gathers points of interest in the binary programming of the target system 160 or device, discover highly reliable injection parameters that trigger these targeted POIs and analyze and store the results of exercising each POI without a need for human intervention.

Referring to FIGS. 1-3, a code segment 300 contains a point of interest 310, denoted by a candidate instruction 312, in this case a branch instruction, granting or denying access based on an authentication check. The code segment 300 is generated from a disassembly of an executable or identified in source code or an assembler expansion of the opcodes involved. Each opcode is an instruction or data value that occupies a single word of the processor 124; some opcodes require or accept multiple words as parameters. Each opcode also incurs a processing time, so the number of instructions in the code segment 300 can be used to accumulate an elapsed time for the processor to proceed to the branch instruction 312.

In the normal, non-injection affected path, the candidate instruction 312 at memory location 27FA performs a comparison on an authentication value in processor register 3 (R3), and branches to location 2DF0 for a success path at code segment 314, and onto code segment 320 on a success path 318 defined by code label auth_ok at segment 320. A failure path 322 denies access as the check at candidate instruction 312 fails.

An injection 150 performed at candidate instruction 312 may result in the check proceeding down the success path 318 even if the R3 value was undeserving of entry. Such a successful injection therefore alters normal flow and effectively bypasses an authentication check such as a password comparison, and grants entry and access. The injection 150 may include at least one of a power surge, electromagnetic interference, magnetic interference, and also has a magnitude, duration and location on a processor 124 on which the candidate instruction is performed, now discussed further with respect to FIGS. 4 and 5.

Figure 4:
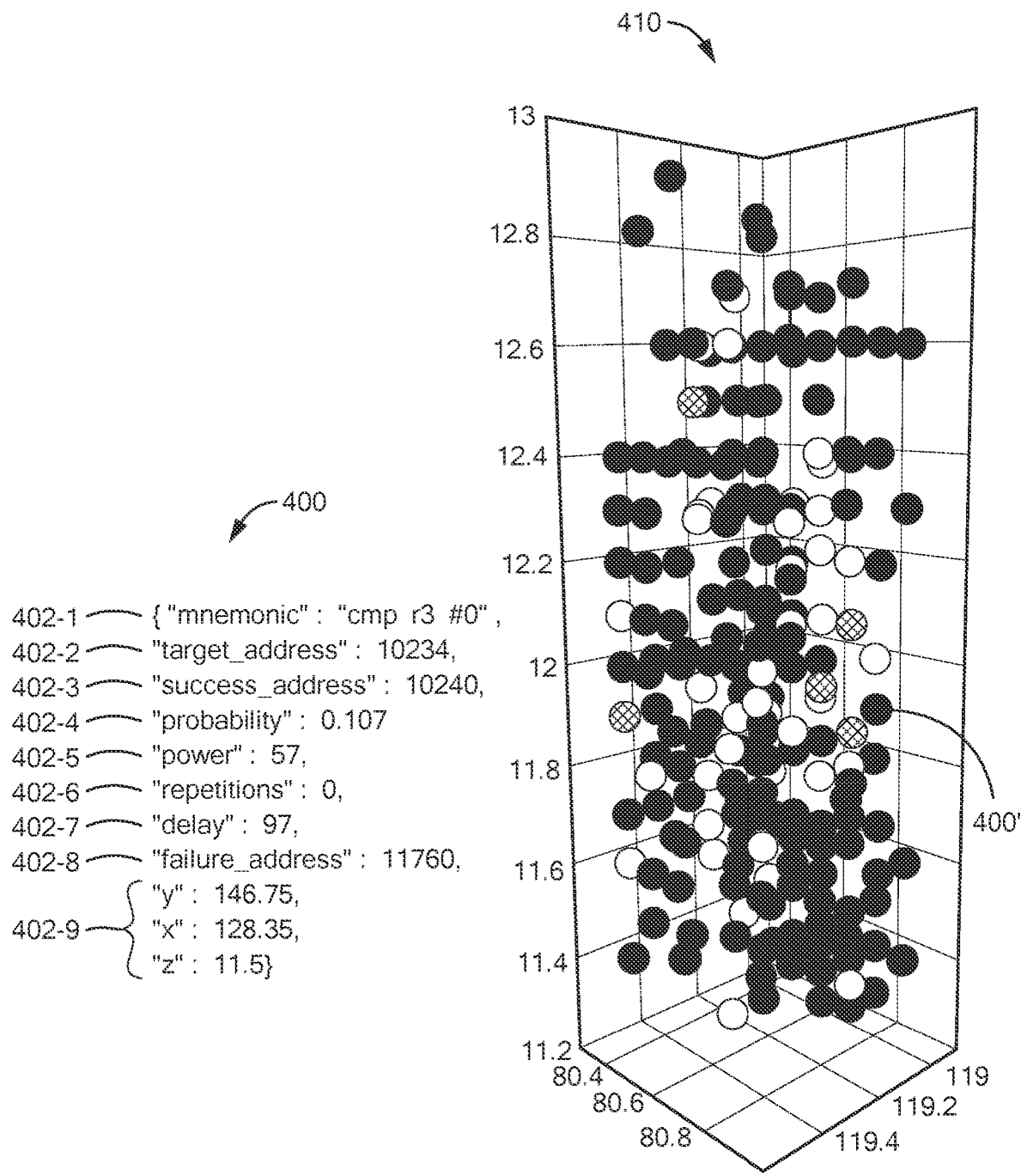
FIG. 4 shows an example of a fault injection in an injection chain directed at the code of FIG. 3.

FIG. 4 shows an example of a fault injection in an injection chain directed at the code of FIG. 3. A successful injection 150 occurring at instruction 312 causes the auth_ok path for system entry to be followed/executed. The injection 150 is defined by injection parameters 400. Injection parameters include a mnemonic 402-1, matching the mnemonic instruction "cmp R3 #0." The target address 402-2 is the decimal value 10234 for the hex address 27FA of the candidate instruction 312.

Further, each injection 150 may further comprise an injection chain. An injection chain is a set of injections and their respective parameters necessary to cause a desired effect. From the locations defined as points of interest (POIs), injection chains are selected that would cause desired behavior on the target system. Each injection chain contains timing information the address in the application being targeted, and various other technical pieces of information. An injection chain is therefore an arbitrary number of independent injection candidate locations that identifies areas of code that are susceptible to injections as having a high probability of modifying control flow in a desired way.

For each sample injection, the injection parameters 400 include a memory location on the processor storing the candidate instruction. Each entry for a sample injection stores the memory location and the next execution address which is executed based on the injection inducing a result in execution (success) and a next execution address which is executed based on the injection having no effect on the execution of the candidate instruction (failure). The success address 402-3 corresponds to address 2800 hex, which coincides with the auth_ok label commencing the success path 320. The probability 402-4 results from analysis of multiple injections by the ML model 149 and indicates the likelihood of the injection succeeding. The power 402-5 indicates a relative power of the emf injection, repetitions and delay 402-6, 402-7 refer to recurrences of the EMF pulse. The failure address 402-8 of (11760) gives the hex location 2DF0 of execution on authentication failure, i.e. failure of the injection to affect execution on failure path 322. The coordinates 402-9 define the location on the chip where the EMF pulse is directed.

Figure 5:
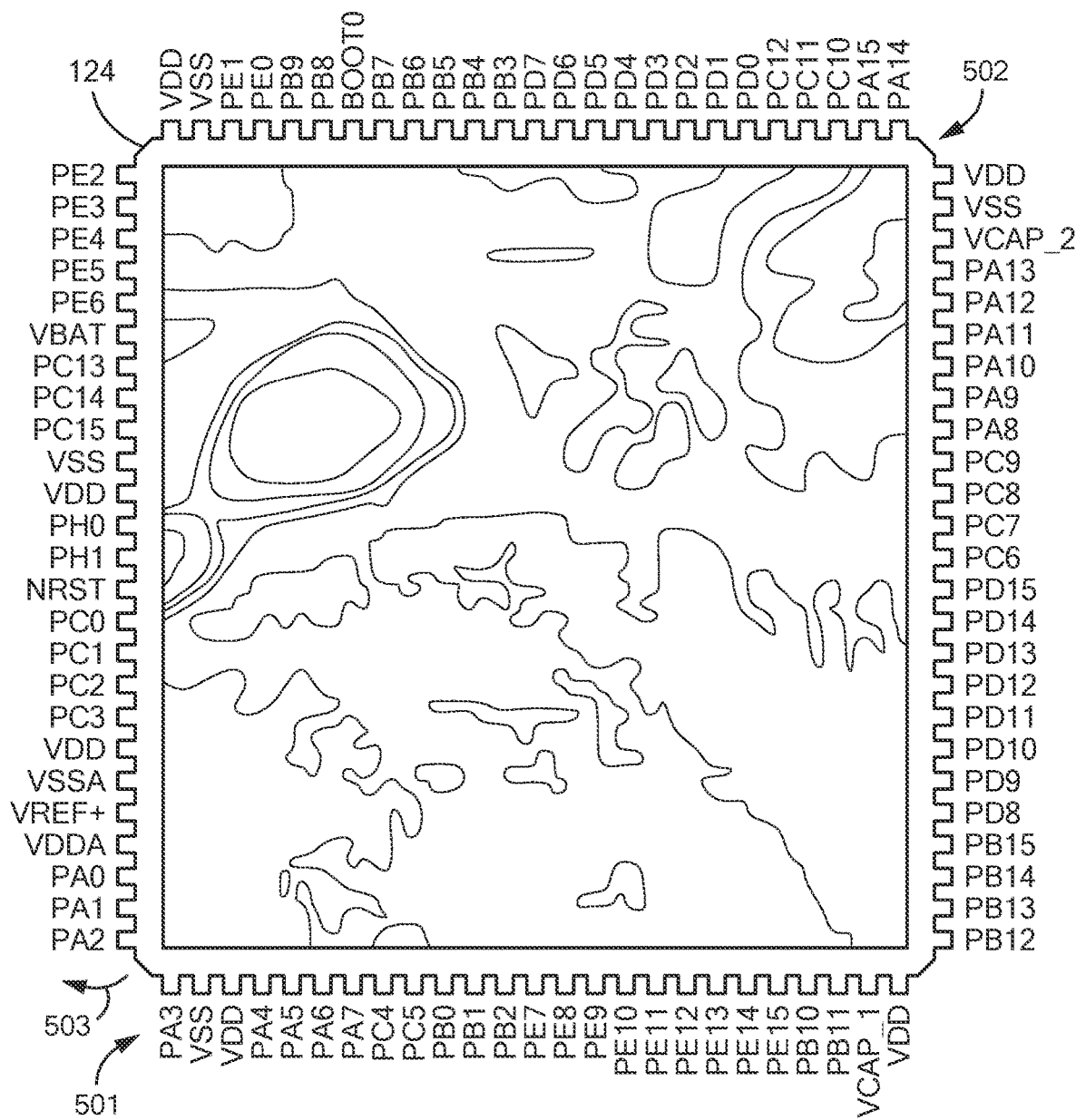
FIG. 5 shows a mapping of a processor responsive to the injection as in FIG. 4.

FIG. 5 shows mapping of a processor responsive to the injection as in FIG. 4. Referring to FIGS. 1 and 4 and 5, the injection is defined by a location on a planar area of the processor 124 executing the candidate instruction 312. The coordinates 402-9 indicate an x-axis 501 and a y-axis 502 locating the EMF pulse, and a z-axis 503 extending normal to the processor surface indicates a distance above the processor or circuit board. A cluster graph 410 denotes the locations on the processor such that each point 400' on the cluster graph corresponds to a set of injection parameters 402. The injection parameters are also stored and analyzed by the ML model 149. As indicated above, each entry of a sample injection also has parameters for power, delay, period, polarity and repetition of an electromagnetic pulse directed at the location.

FIG. 6 shows operation of an injected fault as in FIG. 4 on an instruction sequence as in FIG. 3. Referring to FIGS. 1, 4, 5 and 6, the instruction sequence 162 is defined by a sequence of memory locations containing opcodes interpreted by the processor 124 in order according to the processor speed, although branch instruction for decision points and function calls defer control to specific locations, so sequential locations do not necessarily define sequential execution.

Recall that a compiled executable program or instruction sequence occupies a particular location in a memory of a host machine and processor executing the launched program. It can be tedious to revise and/or locate particular points of interest to run a number of test cases. Accordingly, configurations herein dynamically instrument a target binary for the injection or injection chain to avoid cumbersome reloading and launching for each injection.

The example of FIG. 6 involves insertion of GPIO (General Purpose Input/Output) Trigger and NOPS (No Operation machine instructions) directly before the address targeted in the chain. Breakpoints are on the first addresses in the success or failure path to identify when processing has proceeded thus far.

To test out new locations without having to statically modify or recompile existing binaries (executable files) the disclosed approach allows the analysis engine 140 to attach to a running process or target 160, set a breakpoint and store GPIO code into an unused code segment for performing the injection instruction sequence. This forces the PC to go to the GPIO code and execute, commence the injection, and jump back into normal control flow.

In operation, performing the injection further includes identifying an instruction 311 in the instruction sequence that precedes the candidate instruction 312. In the testing environment depicted herein, a plurality of candidate injections are iteratively performed to build the ML model 149 of successful injections, generally noted by likelihood of success. An injection instruction sequence is developed for generating the sample injection during execution. This is code that actually performs the injection according to the injection parameters 402 for a given candidate instruction. A null or non-executed memory region in a program memory space allocated to the instruction sequence is identified, such that the non-executed memory region has sufficient space for storing the injection instruction sequence 610. The injection instruction sequence is stored in the identified non-executed memory region such that it will not interfere with the executing instruction sequence 162.

A breakpoint is directed at the identified preceding instruction 311 for executing the injected instruction sequence upon program execution attaining the identified preceding instruction 311. In the example arrangement, the preceding instruction 311 is the instruction immediately before the address of the candidate instruction 312. Upon execution reaching the preceding instruction 311, a debug trigger or other intercept activity is invoked to direct program control to the injection instruction sequence 610 by setting the debugger triggers at the immediately preceding instruction, shown by arrow 612. Execution of the injection instruction sequence 610 causes the injection, shown by arrow 614, which occurs according to the injection parameters 402 for the candidate instruction. After execution of the injection instruction sequence 610, control returns via arrow 616 to the candidate instruction 312 where the results of the injection are manifested. If the injection was not successful, control passes sequentially to the failure path 322, where the execution address identifies the outcome.

Breakpoints are set at successive memory locations on the paths corresponding to both a successful 318 injection flow modification and a failed injection flow 322 modification, and success or failure of the sample injection based on the set breakpoints. If the injection was successful, the branch 618 from candidate instruction 312 is followed, bypassing the failure path 322 and continuing to the success path 318, again denoted from execution by the processor/program counter encountering the success address. It should be noted that a variety of scenarios may be envisioned with branching at decision points and otherwise inducing altered behavior into the instruction sequence.

It should be noted that the resulting induced behavior is probabilistic based on the physics of the processor, the executed instructions, and the effect of the EMF pulse or other injection. The opcode is defined by a sequence of binary digits interpreted by the processor, and the EMF pulse introduces an analog disturbance that may alter a voltage level or other characteristic that causes the processor to interpret one or more of these voltages in a different manner. For example, a typical binary digit is represented by +5 volts. This may be more in the range of 4.5 volts in practice. If the processor "sees" a lower voltage, such as 2.0 volts, it may interpret the value as a binary "0" rather than a binary "1." The processor is digital and can only interpret either a 1 or 0; voltages in the midrange will be interpreted as one or the other. A particular injection may have the effect of reducing the voltage by, say, 1.5-2.5 volts, therefore causing the processor to interpret a value of 2.0-3.0 volts. Iterations resulting in a 2 volt value are more likely to be interpreted as a binary 0, while higher voltage may be interpreted as a binary 1. Configurations herein normalize the variance to identify scenarios, or injection parameters, having a predictable effect.

Figure 7A:
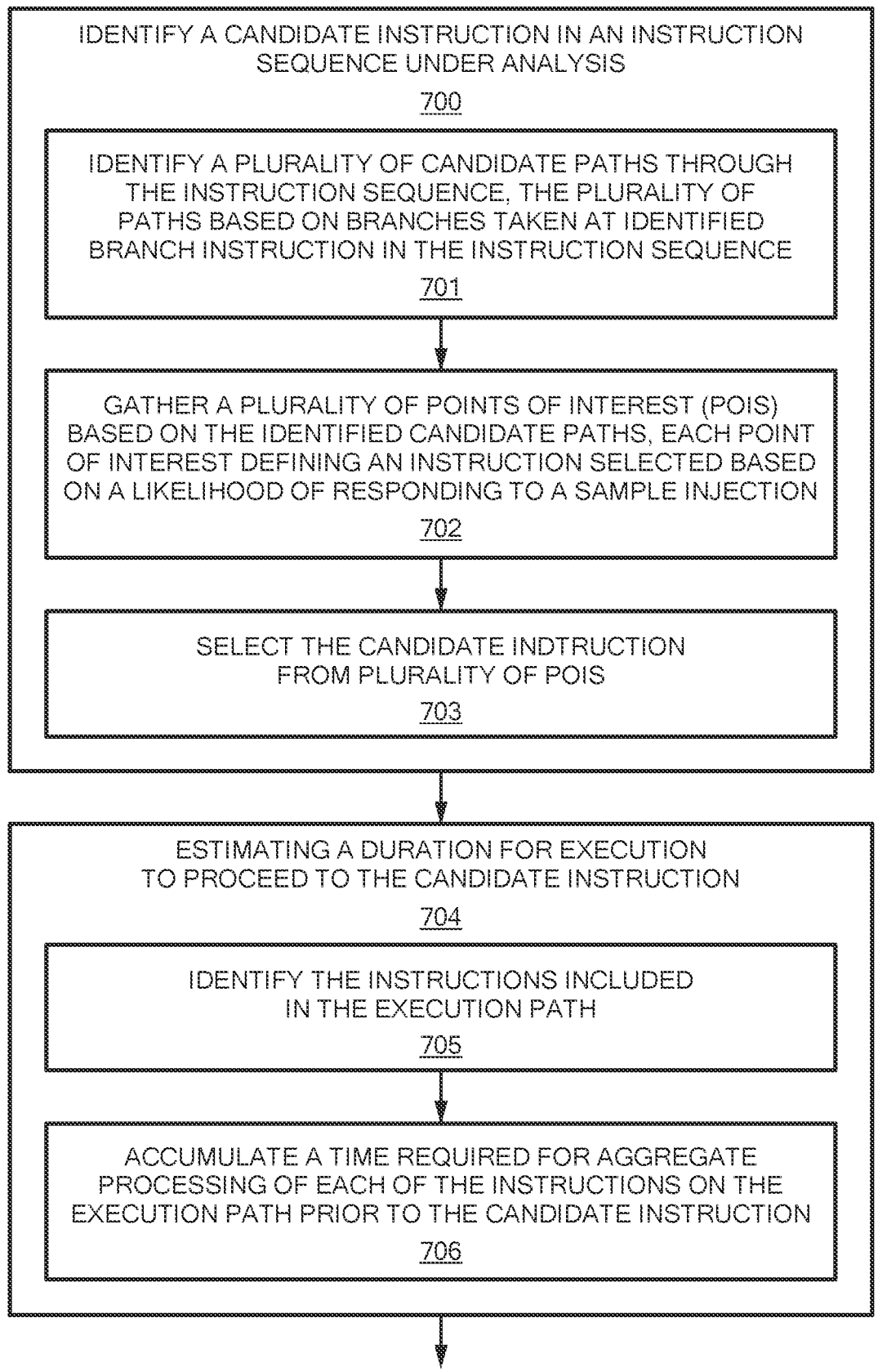
FIGS. 7A-7B show a flowchart of fault injection testing as in FIGS. 1-6.
Figure 7B:
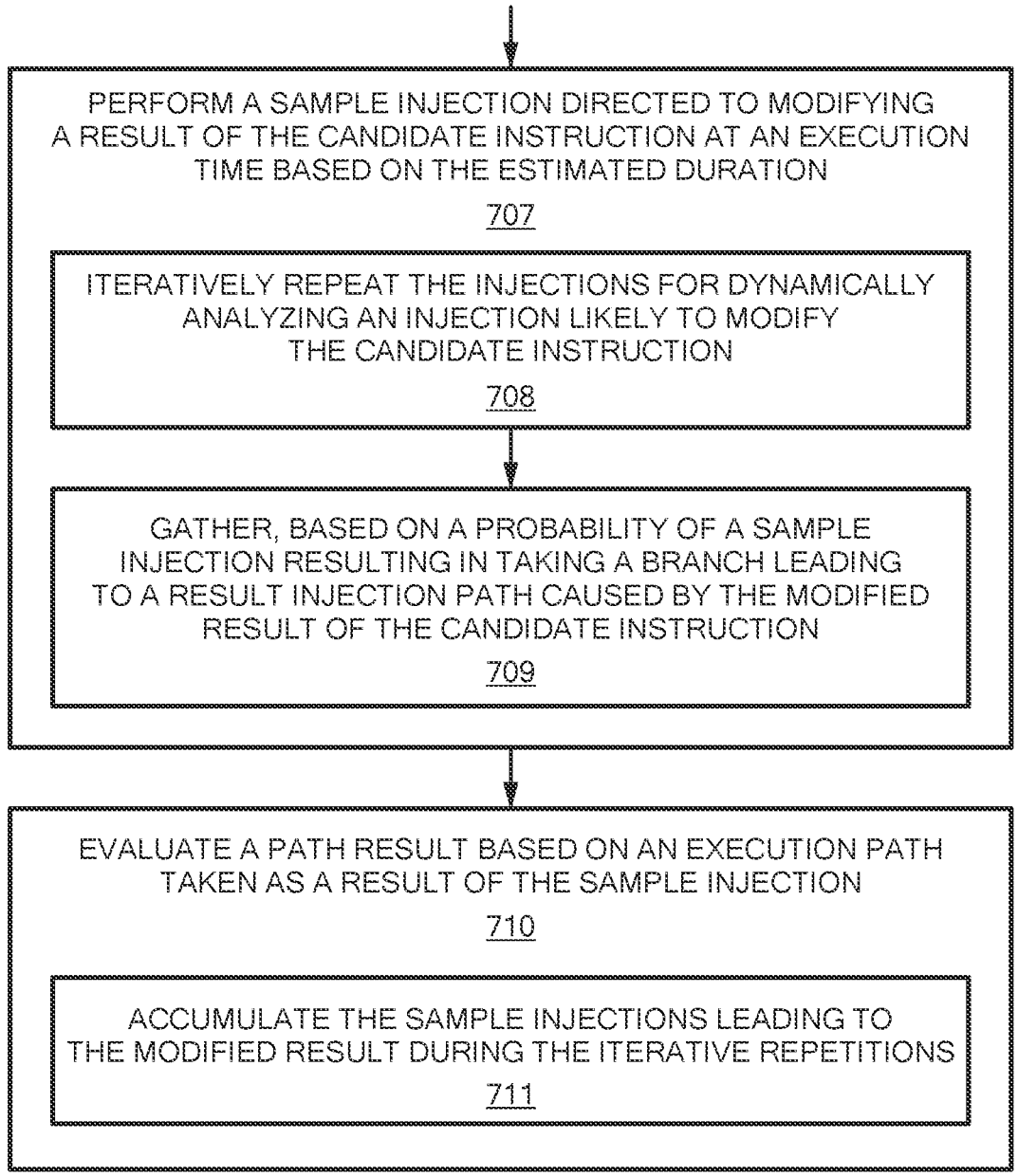

FIGS. 7A-7B show a flowchart of fault injection testing as in FIGS. 1-6. Referring to FIGS. 1-7B, at step 700, the analysis engine 140 identifies a candidate instruction 312 in an instruction sequence under analysis. This includes identifying, from the candidate instruction sequence, a plurality of candidate paths through the instruction sequence, as depicted at step 701. In the example configurations, the plurality of paths are based on branches taken at identified branch instructions in the instruction sequence 162, since there are the most likely locations to have a meaningful effect towards an induced outcome. From the plurality of paths, an example of plurality of points of interest (POIs) are identified, such that each point of interest defines an instruction selected based on a likelihood of responding to a sample injection, as disclosed at step 702. A branch instruction is depicted as an example target, however any location or register may be employed. In other words, an injection in a non-branching section of code may only have a short reaching effect on a local variable and is less likely to manipulate execution results. The candidate instruction 312 is then selected from plurality of POIs, as shown at step 703.

It should be emphasized that the target or result of the injection chain may affect any suitable memory or electromagnetically maintained location. The disclosed approach gathers expected outcomes from injection on any instruction, and selects the ones with the highest likelihood of success. For example, in some cases a processor would load a certain value into a certain register to perform some action, and result in a change to that value. Or, in some circumstances the system can completely mutate an instruction to be another instruction entirely. In other cases, the approach can directly manipulate the values in structured memory accesses, so that values are stored into nearby or neighboring locations. Recall that depending on the architecture of a particular machine, and the code loaded for execution, memory "locations" include not only RAM, but also registers, processor "words," program counters, pipelines, caches, buffers, and the like, and that memory locations may also contain operands (data) and operators, or opcodes (control). Targets of the injection chain may therefore include, for example, manipulation of status registers such as setting flags or even modifying other internal registers such as the program counter. Any such injection may alter the stored bits, and thus the value, for altering the intended execution.

The logic analyzer 144 estimates a duration for execution to proceed to the candidate instruction, as depicted at step 704. This includes, at step 705, identifying the instructions included in the execution path 162 into which the injection is contemplated. A time required for aggregate processing of each of the instructions on the execution path 162 prior to the candidate instruction 132 is computed, as depicted at step 706. The injection chain processor performs a sample injection directed to modifying a result of the candidate instruction 132 at an execution time based on the estimated duration, as disclosed at step 707. EMF inducer 145 or another suitable injection medium may be invoked. Injection chains including one or more injections are iteratively repeated for dynamically analyzing an injection 150 likely to modify, or induce a result, in the candidate instruction 312, as depicted at step 708. Gathered results 164 are accumulated in a file or other storage, and are analyzed based on a probability of a sample injection resulting in taking a branch leading to an injection path caused by the modified result of the candidate instruction, as shown at step 709.

The ML model 149 receives the results for evaluating an execution path taken as a result of the sample injection, as depicted at step 710 Results of the sample injections leading to the modified result during the iterative repetition are accumulated, as shown at step 711 Data aggregation and ML model analysis may take any suitable form for determining injection parameters having a high probability of success.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for forcing a control flow of an instruction sequence, comprising:
identifying a memory location in an instruction sequence under analysis;

estimating a duration for execution to proceed to the identified memory location;

performing a sample injection directed to modifying a value of the memory location at an execution time based on the estimated duration, the memory location including a candidate instruction, and the result of the candidate instruction determines an execution path taken as a result of the sample injection; and evaluating a result of the sample injection, the sample injection defined by a location on a planar area of a processor executing the candidate instruction, the injection including a power, delay and repetition of an electromagnetic pulse directed at the location.

2. The method of claim 1 further comprising identifying a plurality of candidate paths through the instruction sequence, the plurality of candidate paths based on branches taken at identified branch instructions in the instruction sequence;

gathering a plurality of points of interest (POIs) based on the identified candidate paths, each point of interest defining an instruction selected based on a likelihood of responding to a sample injection; and selecting the candidate instruction from plurality of POIs.

3. The method of claim 1 further comprising estimating the duration by:

identifying the instructions included in the execution path; and accumulating a time required for aggregate processing of each of the instructions on the execution path prior to the candidate instruction.

4. The method of claim 1 wherein the injection includes at least one of a power surge, electromagnetic interference, magnetic interference, and a magnitude, duration and location on a processor on which the candidate instruction is performed.

5. The method of claim 1 further comprising, for each sample injection, computing a memory location on the processor storing the candidate instruction;

storing the memory location; and storing a next execution address which is executed based on the injection inducing a result in execution and a next execution address which is executed based on the injection having no effect on the execution of the candidate instruction.

6. The method of claim 1 further comprising:

evaluating the result of the sample injection by storing a next execution address which is executed based on the sample injection inducing a result in execution and a next execution address which is executed based on the injection having no effect on the execution of the candidate instruction.

7. The method of claim 1 further comprising:

evaluating the result of the sample injection based on whether execution of the candidate instruction proceeds to a successive instruction, the successive instruction indicative of either success or failure of the sample injection.

8. A method for forcing a control flow of an instruction sequence, comprising:

identifying a memory location in an instruction sequence under analysis;

estimating a duration for execution to proceed to the identified memory location by identifying the instructions included in the execution path and accumulating a time required for aggregate processing of each of the instructions on the execution path prior to the memory location;

performing a sample injection directed to modifying a value of the memory location at an execution time based on the estimated duration, the memory location including a candidate instruction, and a result of the candidate instruction determines an execution path taken as a result of the sample injection;

evaluating the result of the sample injection;

iteratively repeating the sample injection for dynamically analyzing an injection likely to modify the candidate instruction;

gathering, based on a probability of a sample injection resulting in taking a branch leading to a result injection path caused by the modified result of the candidate instruction; and accumulating the sample injections leading to the modified result during the iterative repetitions.

9. A method for forcing a control flow of an instruction sequence, comprising:

identifying a memory location in an instruction sequence under analysis;

estimating a duration for execution to proceed to the identified memory location performing a sample injection directed to modifying a value of the memory location at an execution time based on the estimated duration, the memory location including a candidate instruction, and the result of the candidate instruction determines an execution path taken as a result of the sample injection, performing the injection further comprising:

identifying an instruction in the instruction sequence that precedes the candidate instruction;

generating an injection instruction sequence for generating the sample injection;

identifying a non-executed memory region in a program memory space allocated to the instruction sequence, the non-executed memory region having sufficient space for storing the injection instruction sequence;

storing the injection instruction sequence in the identified non-executed memory region; and directing a breakpoint at the identified preceding instruction for executing the injected instruction sequence upon program execution attaining the identified preceding instruction; and evaluating a result of the sample injection.

10. The method of claim 9 wherein the preceding instruction is an instruction immediately before the address of the candidate instruction, further comprising directing program control to the injection instruction sequence by setting debugger triggers at the immediately preceding instruction;

setting breakpoints at successive memory locations on paths corresponding to both a successful injection flow modification and a failed injection flow modification; and storing the success or failure of the sample injection based on the set breakpoints.

11. A computer program embodying program code on a non-transitory storage media that, when executed by a processor, performs steps for implementing a method of forcing a control flow of an instruction sequence, the method comprising: identifying a candidate instruction in an instruction sequence under analysis; estimating a duration for execution to proceed to the candidate instruction; performing a sample injection directed to modifying a result of the candidate instruction at an execution time based on the estimated duration, the memory location including a candidate instruction, and the result of the candidate instruction determines an execution path taken as a result of the sample injection; and evaluating a path result based on an execution path taken as a result of the sample injection, the sample injection defined by a location on a planar area of a processor executing the candidate instruction, the injection including a power, delay and repetition of an electromagnetic pulse directed at the location.

* * * * *